INVENTOR.
WILLIAM H. HARRISON,
BY
ATTORNEY.

Sept. 20, 1949.  W. H. HARRISON  2,482,179
CONTINUOUS MOTION PHOTOGRAPHIC APPARATUS
Filed Aug. 9, 1946  2 Sheets-Sheet 2

INVENTOR.
WILLIAM H. HARRISON,
BY
ATTORNEY.

Patented Sept. 20, 1949

2,482,179

UNITED STATES PATENT OFFICE 2,482,179

CONTINUOUS MOTION PHOTOGRAPHIC APPARATUS

William H. Harrison, Los Angeles, Calif.

Application August 9, 1946, Serial No. 689,594

6 Claims. (Cl. 88—16.8)

This invention relates to motion picture projecting apparatus and is particularly applicable, although not limited, to projectors employing continuously moving, as opposed to intermittently moving film. An optical system for effecting such uninterrupted or shutterless cinematic projection is described and claimed in my United States Patent 2,278,781, granted April 7, 1942.

The present invention is directed to eliminating oscillation of the projected image of the film frame occasioned by uneven tension on the film as it passes through the machine and in particular as it goes by the viewing gate or aperture.

In some types of apparatus in the class described, particularly in viewers used for editing motion picture film, the image arresting elements by which the images of the successive frames are held motionless on a projection screen, are driven by the motion of the film itself. That is, as the film is drawn through the projector it passes over a sprocket the consequent rotation of which drives the image arresting element as for example a rotating polygonal prism as used in the device disclosed in my previous patent above referred to. It is particularly important in devices of this latter type, i. e., those projecting the image of a continuously moving film, that a synchronous relationship between the moving film and the image arrestor be maintained. It is desirable in order to maintain this synchronous relationship that the tension in the film at the viewing gate, at the point where the film passes over the aforesaid driving sprocket, and at all points therebetween, remain substantially constant during the operation of the mechanism.

A number of factors may, singly or in combination, produce non-uniform tension of the film in conventional projecting apparatus of the type used heretofore. For example, the increasing amount of film on the take-up reel and the decreasing amount on the supply reel cause a progressive change in the tension which these members exert on the film during the projection of a motion picture. Another factor producing non-uniform tension in the film is occasioned by the fact that film reels are seldom produced by precision manufacturing methods and hence do not rotate evenly. Furthermore, the sides of such reels may not be perfectly parallel thus adding a non-uniform frictional load to the film as it is stripped therefrom or wound thereon. Still further, in all projecting systems, whether hand or power driven, the acceleration applied to the film is far from constant particularly when starting, stopping, or reversing the direction of film motion.

All of the foregoing factors produce non-uniform tension in the film which in turn causes the film to stretch slightly or to spring more or less away from the sprockets or other guide members during its passage through the projection mechanism. This irregular stretching and springing of the film causes a change in relationship between film at the drive sprocket and the film at the projection gate resulting in a floating up and down of the projected image. While these displacements of the film itself are extremely small, the magnification of most projection systems is great enough to produce considerable displacement of the projected image.

Efforts have been made in the past to correct mere non-uniform tension by adding a frictional impedance to the reels during operation of the projector. This expedient, however, has relatively little practical effect since the variations of resistance which it is desired to overcome, cannot be estimated, much less accurately compensated for.

Accordingly, it is a major object of the present invention to eliminate such variable framing by maintaining constant tension in the film and hence constant relationship between the film at the viewing gate and the point on the film where power is taken therefrom to drive an image arresting system such as a rotating optical prism.

A further object of my invention is to provide in a film actuated continuous motion projector of the class described, means forming a uniformly moving free loop of film whereby sound may be reproduced therefrom in synchronism with the projected image.

The foregoing and other objects and advantages of my invention will become apparent from the following description taken in connection with the attached drawings wherein.

Briefly described, my invention contemplates the use of two sprockets having a direct driving connection therebetween, one of which serves to feed film into the projection mechanism from a supply reel, and the other of which serves to feed the film out of said mechanism and onto a take-up reel. During the passage of the film through the projection mechanism power is taken therefrom by a driven sprocket engaged therewith to rotate an image arresting polygonal optical prism. By virtue of the direct driving connection between the feed-in and feed-out sprockets, any variation in the tension and hence the speed of the film in the webs to and from the reels produces a change in speed of rotation of one of the aforesaid sprockets which is immediately reflected in a corresponding change in speed of the other sprocket thus maintaining the tension between the two sprockets substantially constant regardless of the speed or direction of motion of the film. The construction of the apparatus is such that the power necessary to move the film may be applied either by rotating one of the reels to wind film thereon or directly to the feed-in and feed-out sprockets.

Figure 1:
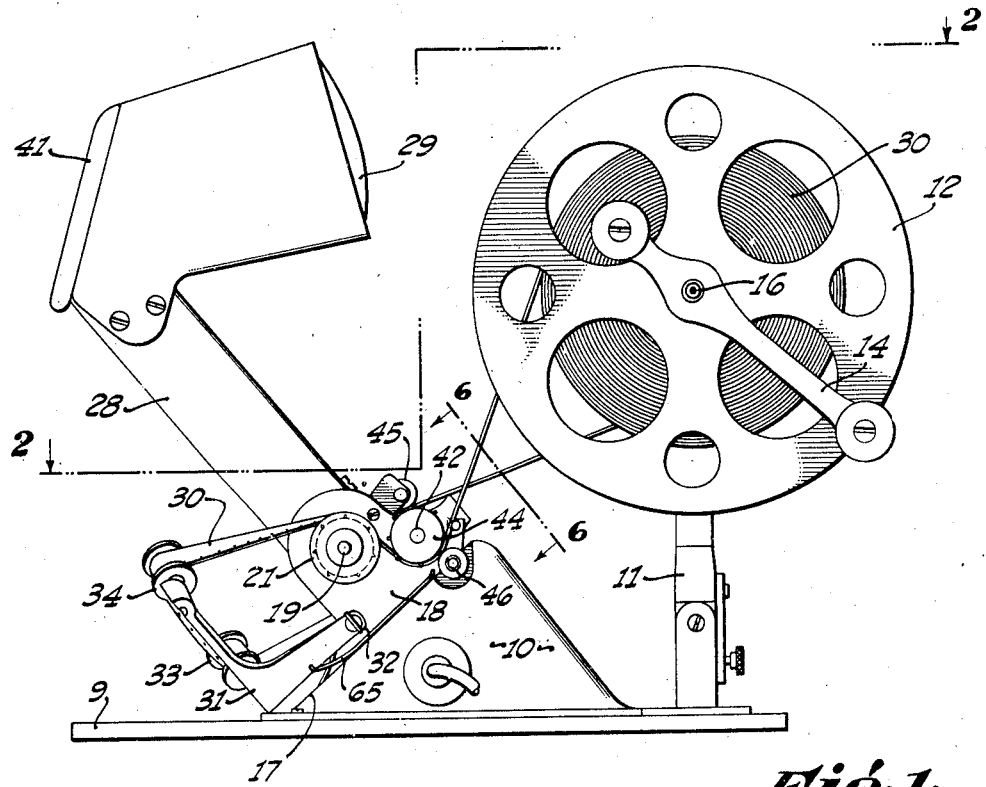
Fig. 1 is a side elevation of a continuous motion viewing device embodying my invention.
Figure 2:
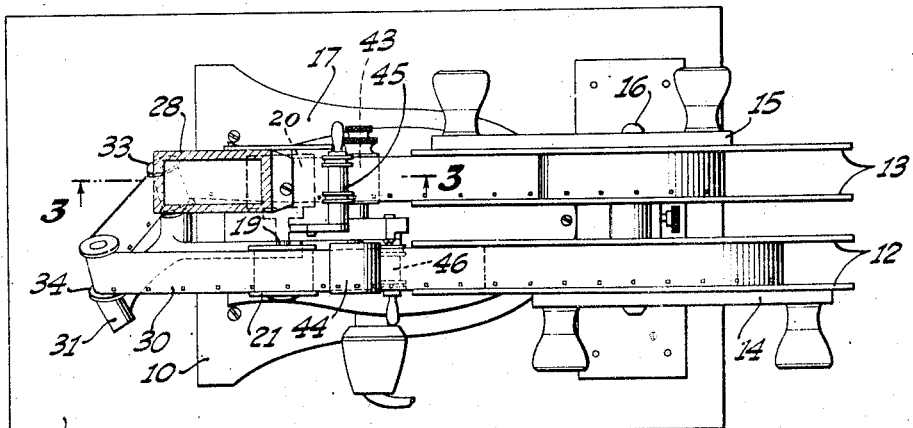
Fig. 2 is a plan view partially sectioned of the device shown in Fig. 1 taken along the line 2—2 in Fig. 1.

For a more detailed description of a viewing device embodying my invention reference is now made to the attached drawings and particularly Fig. 1 thereof. The numeral 9 indicates a base plate upon which is mounted a housing 10 (generally triangular in side elevation) and a vertical support 11 on the upper end of which is mounted a horizontally extending and stationary reel shaft 16. Loosely mounted for free rotation on the shaft 16 are two film reels 12 and 13 provided with cranks 14 and 15 respectively.

While the mechanism described herein is adapted to move the film therethrough in either direction, the discussion will for the moment be confined to motion of the film from the forward reel 12 in Fig. 1 to the rear reel 13 therein.

Accordingly, the forward reel 12 will be referred to hereinafter as the "supply" reel and the rear reel 13 referred to as the "take-up" reel.

Continuing now with the description it will be seen that a vertical bracket 18 extends upwardly and to the left from the left-hand sloping surface 17 of the housing 10 and carries journally mounted therein a horizontal shaft 19 on one end of which is mounted a transparent parallel sided optical prism 20 and on the other end a film sprocket 21 adapted to be driven by moving film engaged therewith. The prism 20 may if desired be made of glass or transparent polymerized plastic resin, and although shown here as octagonal it may have any even number of sides of approximately equal size. The teeth of all sprockets in this apparatus are spaced to engage the perforations of a conventional photographic film, the width being such to accommodate the particular film used.

In the present embodiment single-side-perforated film is shown although the device is obviously adaptable to receive double perforated film.

A lamp 24 is secured to a vertical inner surface of the housing 10 and is aligned with a condenser lens 25 mounted in the left hand sloping side 17 of the housing adjacent the optical prism 20. Projecting upwardly and to the left from the sloping side 17 and along the axis defined by the lamp 24, lens 25, and the prism 20, is a hood 28 of generally rectangular cross-section which is adapted to enclose the rays of light emanating from the lamp 24 and projected upwardly and to the left through the lens 25 and optical prism 20. A projection lens 27 is mounted adjacent the periphery of the optical prism 20 opposite the lens 25 and aligned with the optical axis thereof. The projection lens 27 is positioned and adapted to project images of film lying in a curved plane between the condenser 25 and the prism 20. The image thus projected is reflected from a mirror 41 onto a viewing screen 29 in a manner more fully described in my United States Patents 2,278,781 (April 7, 1942) and 2,325,131 (July 27, 1943).

Figure 6:
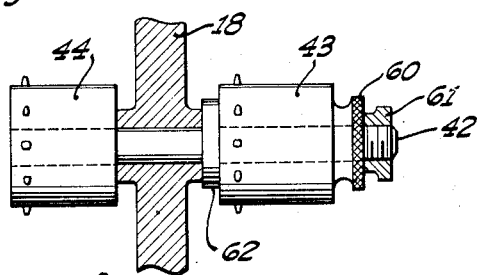
Fig. 6 is a partial oblique section taken on the line 6—6 in Fig. 1.

In the present embodiment the film 30 is moved through the mechanism by a pair of sprockets 43 and 44 secured to a horizontal shaft 42 which is journally mounted in bracket 18 for free rotation therein. As best seen in Fig. 6 sprocket 44 is permanently keyed to the shaft 42 while sprocket 43 is frictionally engaged therewith by means of a knurled nut 61 which clamps it longitudinally against a collar portion 62 of the shaft 42. Sprocket 43 carries a knurled boss 60 projecting to the right therefrom as best seen in Fig. 6 and when the clamping nut 61 is loosened the sprocket 43 may be rotated relative to the sprocket 44 by holding the same stationary and turning the knurled boss 60. The purpose of this adjustment will be described more fully later in the specification.

In order to tension a length of the film 30 as it passes through the mechanism and in order further to shift it laterally so that it may engage both the sprocket 43 and the sprocket 44 a pair of angularly disposed idler pulleys 33 and 34 are included in the film path. The idler pulleys 33 and 34 are journally mounted for free rotation on a pair of shafts projecting from an L shaped bracket 31 pivotally mounted to and projecting to the left of the housing 10. As can be seen best in Fig. 1, the L shape of the bracket 31 is such that it tends to rotate counter-clockwise about its pivoted end 32 under the influence of gravity or, if desired, by spring tension such as that produced by a spring 65 shown in Fig. 1. Thus it will be seen that the bracket 31 and the idler pulleys 33 and 34 carried thereon serve to shift the film laterally as required and at the same time to exert a slight tension thereon.

In passing through the mechanism the film passes under the feed-in sprocket 44 and over the feed-out sprocket 43 and is held in engagement with the lower and upper sides of these sprockets respectively by a pair of spring loaded, hinged rollers 45 and 46 in a manner well known in the art of perforated film mechanisms. As hereinbefore state it is one purpose of the mechanism disclosed to use the moving film to drive the stop motion mechanism, which is, in the present embodiment, the rotating prism 20. To this end a web of the film between the feed-in and feed-out sprockets 43 and 44 is passed over the driven sprocket 21 which as previously described is mounted on one end of the shaft carrying the prism 20. In this manner the prism 20 is rotated in synchronism with the moving film the size of the driven sprocket 21 and the number of teeth thereon being such as to produce the proper relative speed of the prism 20 that a motion picture is projected from the continuously moving film in the manner described in my United States Patent 2,278,781 (April 7, 1942). As the film passes under the prism 20 the tension thereon holds it in sliding contact with a curved gate 47 thus assuring that the film lies in the image plane at all times.

It will be apparent that the film is under constant tension between the feed-in sprocket 44 and the feed-out sprocket 43. Thus there will be no variable stretching or other erratic distortion of the film in any portion of its length within the mechanism. It is particularly important that the length of film in that portion of the film loop which lies between the driven sprocket 21 and the gate 47 remain constant at all times, and regardless of the direction of film travel. As the film is pulled off one of the sprockets 43 or 44 by power applied to one of the reels, an equivalent amount of film is fed into the mechanism from the other reel by the sprocket on the opposite end of the shaft 42.

In the present embodiment cranks 14 and 15 are provided on the reels for the purpose of manually driving the mechanism. Mechanical power such as delivered by an electric motor can of course be applied either to one of the reels or to the shaft 42. In the latter case the conventional over-running belt or similar means should be used to drive the take-up reel. Such film take-up mechanisms are now well known in the art and need not be discussed here.

Figure 3:
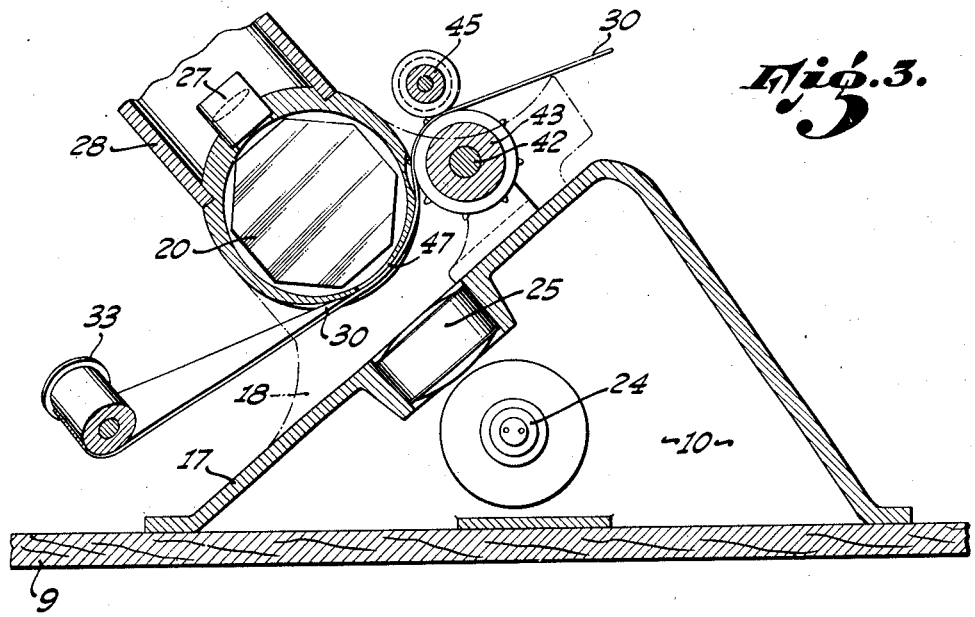
Fig. 3 is a vertical section of a portion of the device taken on the line 3—3 in Fig. 2.

Variable framing means are included in the present device in order that it shall be adapted to receive film exposed in various types of cameras. The relationship between the sprocket holes and the picture frames of motion picture film depends upon the construction and adjustment of the camera in which it was exposed, and this relationship is not maintained uniform for all makes of cameras or even for different individual cameras of the same make. For proper framing it is essential that the relationship between the moving film and the rotating prism 20 be such that when the center of one of the frames on the film lies on the optical axis, a pair of the opposite faces on the prism 20 are also centered on the axis. Fig. 3 shows the prism in this position. It is obvious that when the film is properly framed a certain finite length of film will lie in the loop between the gate 47 and the driven sprocket 21. It is also obvious that the length of this loop can be incrementally adjusted by shifting the film on the teeth of feed-out sprocket 43, the reduced length of film being compensated for by clockwise rotation of the idler bracket 31 and the idler pulleys 33 and 34 carried thereby. Such adjustment is however limited to steps equal to the space between sprocket teeth on the sprocket 43, and it is usual that these steps are too large to permit accurate framing. In order then to provide for continuous and convenient adjustment of the length of the film loop between the drive sprocket 21 and the gate 47, the feed-out sprocket 43 is so mounted to the shaft 42 that it may be loosened for free rotation thereon. The nature of this mounting is illustrated in Fig. 6 wherein it will be seen that while the sprocket 44 is permanently keyed to the shaft 42, the sprocket 43 may be rotated thereon when the clamping nut 61 is loosened. This operation is preferably performed after the film has been threaded through the mechanism at which time the operator may hold the sprocket 44 stationary, loosen clamping nut 61 and rotate the sprocket 43 on shaft 42 using the knurled hub 60. This operation is performed while watching the viewing screen 49 to determine when the film is properly framed. When sprocket 43 has been adjusted to secure correct framing the nut 61 is then tightened and the sprockets 43 and 44 rotate in unison thereafter.

One of the principal advantages of the mechanism disclosed herein is that it can be reversed at any time to change the direction of film travel without materially affecting the framing or the operation of the stop motion mechanism. This type of reversible operation is particularly valuable in the study of training films or in film editing since it is usually necessary to run back and forth through the same scene several times for study purposes or to determine where the film should be cut, spliced, etc. Using this device for editing, the operator may sit facing the viewing screen 29 (at the right in Fig. 1) holding one of the cranks 14 and 15 in each hand. If it is desired to use this apparatus for the projecting and playing of sound film, the sound pick-up head may be mounted at a suitable point in the loop between the sprockets 43 and 44.

Figure 5:
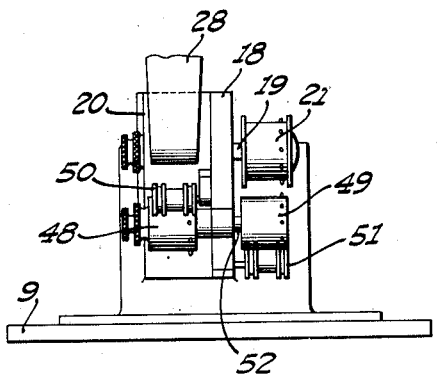
Fig. 5 is an elevational view of the modification shown in Fig. 4 taken on the line 5—5 therein but with the film removed from the device.
Figure 4:
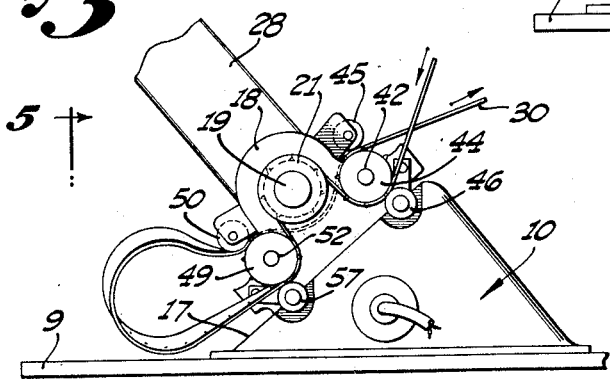
Fig. 4 is a side elevation of the viewing device similar to that shown in Fig. 1 but embodying a modified form of my invention.

In certain applications it is desirable to include in the film path a free untensioned loop of film. To meet such needs I have provided a second embodiment of my invention which is illustrated in Figs. 4 and 5. In this second embodiment the feed-in and feed-out sprockets 43 and 44 are duplicated by a second pair 48 and 49 mounted on a shaft 52 in the same manner as are sprockets 43 and 44 on shaft 42. The shaft 52 is likewise journalled in the bracket 18 and a pair of rollers 50 and 51 similar to rollers 45 and 46 hold the film in engagement with the sprockets 48 and 49. As will be seen in Fig. 4 the threading path of the film is such that it passes under the feed-in sprocket 44 as in the previous embodiment, over the drive sprocket 21 as before, then under the loop feeding sprocket 49 and hence into the untensioned loop. From the loop the film is taken up by passing over the loop take-up sprocket 48 and passes hence under the gate 47 and over the feed-out sprocket 43 as before. In this second embodiment the idler rollers 33 and 34 of the previous embodiment are no longer necessary, their function being performed by the sprockets 48 and 49. The size of the untensioned loop may be as large or as small as desired and hence the mechanism is adapted to receive sound film in which the separation between any particular frame and the corresponding point in the sound track is too great to permit playing of the film in the device illustrated in Fig. 1. In order to provide for adjustable framing as in the embodiment previously described, one of the loop feeding sprockets, e. g. 49, may be provided with a threaded clamp unit similar to 61.

While sprockets are the usual and most practical means for handling perforated film, the device of my invention may be constructed with friction rollers or similar film conveying means for handling unperforated film. Likewise, the means for adjusting the framing may operate either as in the present embodiment to change the relationship between the feed-in and feed-out sprockets or if desired similar means may be employed to change the angular relationship between the prism 20 and the driven sprocket 21 to achieve the same results.

While the forms of my invention described herein and illustrated in the accompanying drawings are fully capable of attaining the objects and providing the advantages hereinbefore mentioned, it is to be understood that they are illustrative only and that I do not mean to be limited thereto but rather to the scope of the appended claims.

I claim:

1. In motion picture apparatus of the class described which includes a film viewing aperture in the optical system thereof, the combination of: a pair of journally and coaxially mounted sprockets, one of which is adapted to feed film into a taut threading path which includes said viewing aperture and the other of which is adapted to feed film out of said path; direct driving connection between said sprockets whereby the same are adapted to rotate in unison and move said film through said path under continuously uniform tension; and idler pulley means included in said path adapted to shift the same laterally and permit said film to operatively engage both of said sprockets, said idler pulley means being movable and including means to urge the same in a direction to tauten the film in said path.

2. In motion picture apparatus of the class described which includes a film viewing aperture and an image arresting system in the optical system thereof, the combination of: a pair of journally mounted sprockets, one of which is adapted to feed film into a threading path which includes said viewing aperture and the other of which is adapted to feed film out of said path, direct driving connection between said sprockets including a member fixed to both of said sprockets whereby the same are adapted to rotate in unison and move said film through said path under continuously uniform tension; film tautening means positioned and adapted to engage the film in said path; power take-off means positioned within said path operatively engaged with said film and connected with said image arresting system whereby to operate the latter as a result of, and in synchronism with motion of said film; and clutch means in said driving connection manually operable to release one of said sprockets from said member and to change the synchronous relationship between film in said viewing aperture and said image arresting system.

3. In motion picture apparatus of the class described which includes a film viewing aperture and an image arrestor in the optical system thereof, the combination of: a pair of journally and coaxially mounted feed sprockets, one of which is adapted to feed film into a threading path which includes said viewing aperture and the other of which is adapted to feed film out of said path; direct driving connection between said sprockets whereby the same are adapted to rotate in unison and move said film through said path under continuously uniform tension; idler pulley means included in said path whereby to shift the same laterally and permit said film to operatively engage both of said sprockets; pressure means to tauten the film in said path; a driven sprocket engaged with said film at a point in said path and operatively connected to said image arrestor whereby to operate the same in synchronism with motion of said film; and clutch means in said feed sprocket connection adapted to selectively disengage one of said feed sprockets for free rotation with respect to the other thereof whereby to permit adjustable change in the length of film in said path between said driven sprocket and said viewing aperture.

4. In motion picture apparatus of the class described which includes a film viewing aperture in the optical system thereof, the combination of: a pair of journally and coaxially mounted sprockets, one of which is adapted to feed film into a threading path which includes said viewing aperture and the other of which is adapted to feed film out of said path; direct driving connection between said sprockets whereby the same are adapted to rotate in unison and move said film through said path under continuously uniform tension; a pair of idler pulleys located in said path and with the rotary axes thereof angularly disposed of such axes of said feed sprocket whereby to shift said path laterally and permit said film to operatively engage both of said sprockets; and pressure means to urge said pulleys in a direction to tauten film in said path.

5. In motion picture apparatus of the class described which includes a film viewing aperture in the optical system thereof, the combination of: a pair of journally and coaxially mounted sprockets, one of which is adapted to feed film into a threading path which includes said viewing aperture and the other of which is adapted to feed film out of said path; direct driving connection between said sprockets whereby the same are adapted to rotate in unison and move said film through said path under continuously uniform tension; a pair of idler pulleys located in said path and with the rotary axes thereof angularly disposed to such axes of said feed sprocket whereby to shift said path laterally and permit said film to operatively engage both of said sprockets; a hingedly mounted bracket adapted to support said idler pulleys for free rotation thereon and to swing the same arcuately about the hinge line of said bracket whereby to tension said film in said threading path; and means to urge said swinging motion.

6. In motion picture apparatus of the class described which includes a film viewing aperture and a rotatively mounted optical prism in the optical system thereof, the combination of: a pair of journally and coaxially mounted sprockets one of which is adapted to feed film into a threading path which includes said viewing aperture and the other of which is adapted to feed film out of said path; a shaft connecting said sprockets whereby the same are adapted to rotate in unison and move said film through said path under continuously uniform tension; a pair of idler pulleys located in said path and with the rotary axes thereof angularly disposed to said axis of the feed sprockets whereby to shift said path laterally and permit said film to operatively engage both of said sprockets; a driven sprocket operatively engaged with said film at a point in the path thereof immediately adjacent one of said feed sprockets the other thereof being adjacent said viewing aperture; a shaft keyed to said driven sprocket and carrying said prism at an opposite end thereof whereby to rotate said prism in synchronism with motion of said film; a bracket adapted to support said idler pulleys for free rotation thereof said bracket being hingedly mounted whereby to swing downwardly under the influence of gravity and tension said film in said threading path; a spring operatively associated with said bracket whereby to urge said swinging motion thereof; a pair of reels each mounted for free rotation adjacent one of said feed sprockets and each adapted to supply film to, or receive film from, said adjacent sprocket; and means within the control of an operator and connected to said reels whereby to selectively rotate the same to wind film thereon.

WILLIAM H. HARRISON.

(References on following page)

REFERENCES CITED

The following references are of record in the file of this patent:

UNITED STATES PATENTS

| Number | Name | Date |
|---|---|---|
| 1,283,577 | Sloman | Nov. 5, 1918 |
| 1,287,353 | Larsen et al. | Dec. 10, 1918 |
| 1,303,543 | De Vry | May 13, 1919 |
| 1,317,637 | Mueller | Sept. 30, 1919 |
| 1,616,054 | Lyle | Feb. 1, 1927 |
| 1,935,572 | Leventhal | Nov. 14, 1933 |
| 2,055,492 | Holst | Sept. 29, 1936 |
| 2,325,131 | Harrison | July 27, 1943 |